United States Patent [19]

Poehlein

[11] Patent Number: 5,107,194
[45] Date of Patent: Apr. 21, 1992

[54] STEPPER MOTOR CONTROL TO VARY OUTPUT TORQUE

[75] Inventor: Raymond E. Poehlein, Fairport, N.Y.

[73] Assignee: Xerox Corporation, Stamford, Conn.

[21] Appl. No.: 393,201

[22] Filed: Aug. 14, 1989

[51] Int. Cl.$^5$ ............................................. H02P 8/00
[52] U.S. Cl. ............................................. 318/696; 318/685
[58] Field of Search ............... 318/646, 685; 355/285, 355/290, 295

[56] References Cited

U.S. PATENT DOCUMENTS

| | | | |
|---|---|---|---|
| 3,855,515 | 12/1974 | Hutchins, Jr. ......................... | 318/685 |
| 3,909,125 | 9/1975 | Reehil et al. ......................... | 355/3 |
| 3,921,043 | 11/1975 | Luzio ......................... | 318/7 |
| 4,340,848 | 7/1982 | Hanagata et al. ............... | 318/696 X |
| 4,496,891 | 1/1985 | Kobayashi ......................... | 318/696 |
| 4,822,978 | 4/1989 | Morris et al. ......................... | 355/290 |

*Primary Examiner*—William M. Shoop, Jr.
*Assistant Examiner*—Saul M. Bergmann

[57] ABSTRACT

A mechanical drive system with different load requirements is enabled by a motor whose input is varied in response to known changes in output torque requirements during various time segments of the duty cycle. In one example a fuser roll in a copier is driven by a DC stepper motor during a period in which a copy sheet is in the fusing area at a first speed $V_1$. Upon completion of the fusing portion of the cycle, the fuser load requirements increase requiring a higher torque to be delivered by the motor. The change in fuser operation is determined by timing and an appropriate signal is sent to the control circuit reducing the motor speed, and allowing the motor to produce the additional torque required.

1 Claim, 3 Drawing Sheets

STEPPER MOTOR CONTROL TO VARY OUTPUT TORQUE

BACKGROUND AND INFORMATION DISCLOSURE STATEMENT

The present invention is directed towards the control of a stepper motor and, more particularly, to controlling the maximum output torque of the motor to match load torque requirements by varying the motor speed.

There are many mechanical systems where it is required to drive a load where the drive torque required to drive the load is not constant. As an example, the torque required to drive an automobile in the normal manner varies from the time motion is started until driving speed is reached. It is desirable for the engine to deliver more torque to the wheels when the automobile is being accelerated than when moving at a constant or decreasing speed. In the automobile, a transmission is sued to change the mechanical advantage in the drive train to vary the drive torque delivered to the wheels. In a similar manner, the present invention uses the input to a stepper motor to drive the motor at different speeds, depending on the torque required to drive a load, during the drive cycle.

Some examples of stepper motor controls are found in the following prior art references: U.S. Pat. No. 3,909,125 discloses a control circuit for accurately positioning the shaft of a multi-phase stepper motor by selective energization of respective phases of the motor under the influence of a low duty cycle power supply in a one-way clutching mechanism. U.S. Pat. No. 3,921,043 discloses an apparatus for maintaining constant the torque output from a first and second motor coupled to a first and second reel.

More particularly, the present invention is directed towards a mechanical drive system wherein a load is driven through a duty cycle with varying torque requirements. The drive system, including a stepper motor, is adapted to operate at a first speed consistent with a first output torque requirement, and later at a second speed consistent with a second torque requirement.

DESCRIPTION OF THE INVENTION

Figure 1:
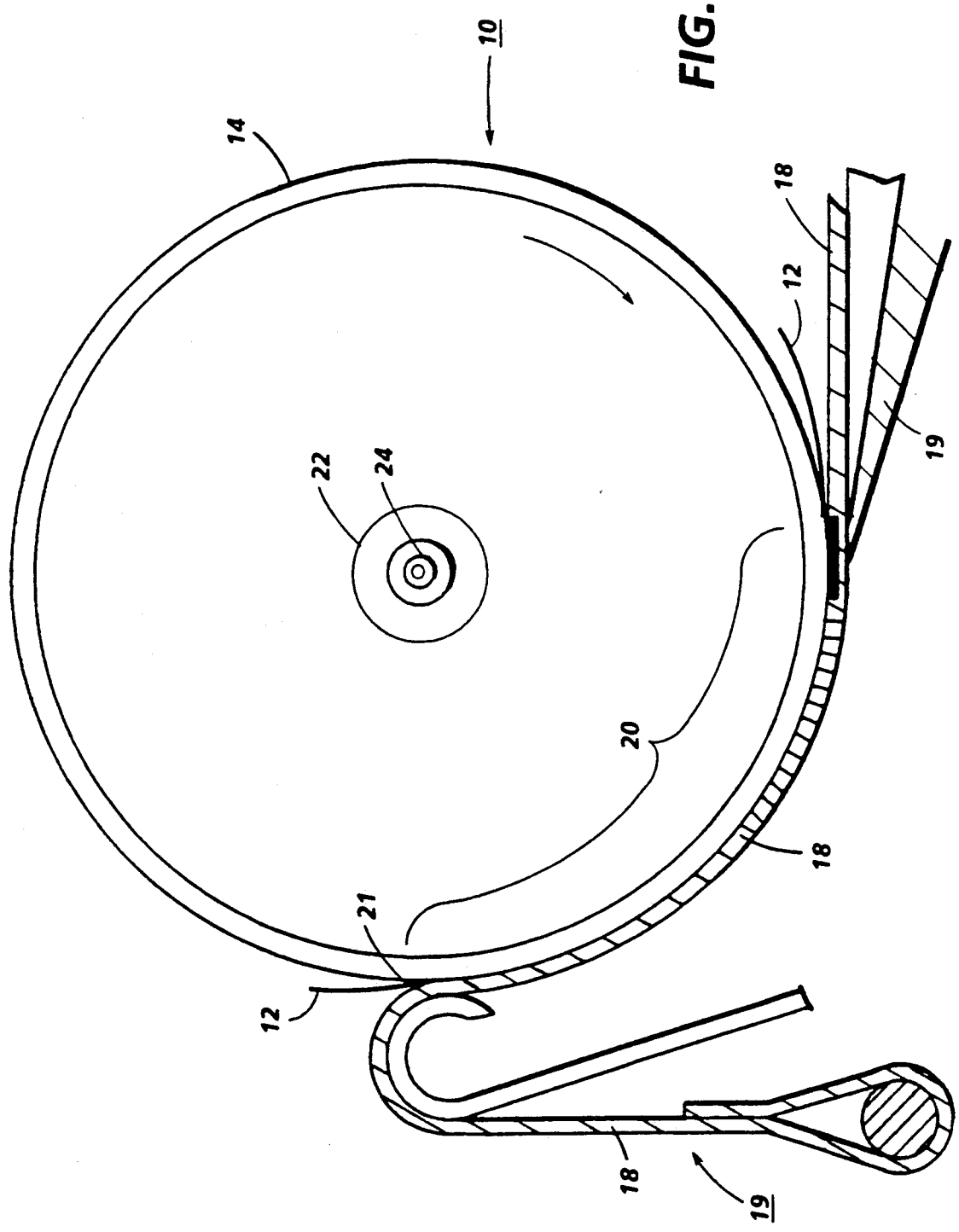
FIG. 1 shows the basic configuration of a fusing station in a xerographic copier utilizing the stepper motor in the manner of the present invention to drive a fuser roll.

FIG. 1 illustrates one example of a mechanical system which has different loading requirements at different time intervals in a functional cycle. The system shown is a fusing system 10 utilized in a xerographic copier to fuse or fix toner particles which have been transferred in image configuration from the surface of a photoreceptor to the surface of an output sheet 12. The output sheet is brought forward to fusing station 10 where the transferred toner image is contacted by a fusing roll 14 forming one part of a heat and pressure fuser. Fuser roll 14 is heated by a suitable heater such as a quartz lamp (not shown) disposed within the interior of roll 14. The other cooperating part of fuser system 10 is a non-rotating elongated pressure web 18. The web is biased into engagement with the fuser roll 14 by a pressure applying mechanism 19. The fuser roll 14 and web 18 cooperate to form an elongated nip 20 therebetween. The sheet passes through the pressure contact formed between the roll and the web and emerges at output point 21 with the toner image fully fused onto the copy sheet and ready to be handled. The torque required to drive the fusing roll 14 depends on the amount of friction that exists between the sliding surfaces in the nip zone 20. When the output sheet 12 is in the nip, the friction is lower than when there is no sheet in the nip. Thus, the torque required to drive the fuser roll is greater when there is no sheet in the nip.

Figure 2:
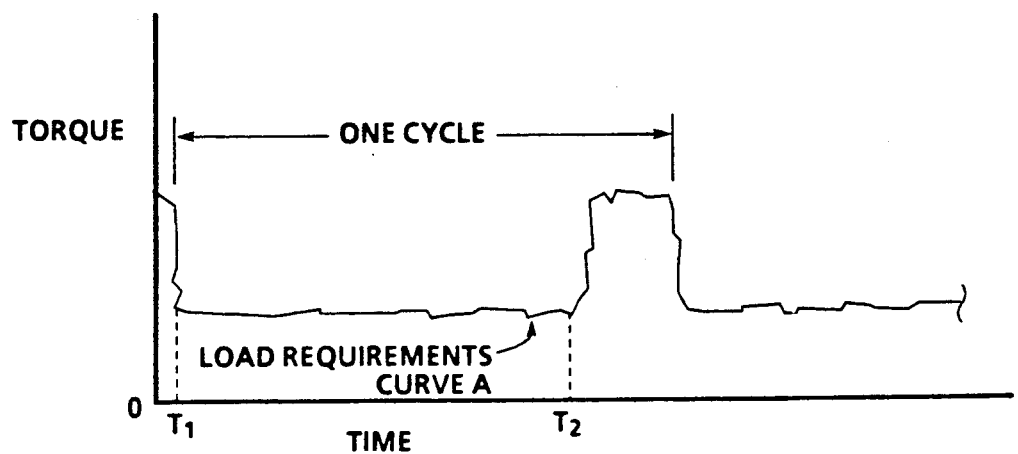
FIG. 2 shows a plot of load torque requirements over a fusing cycle.
Figure 3:
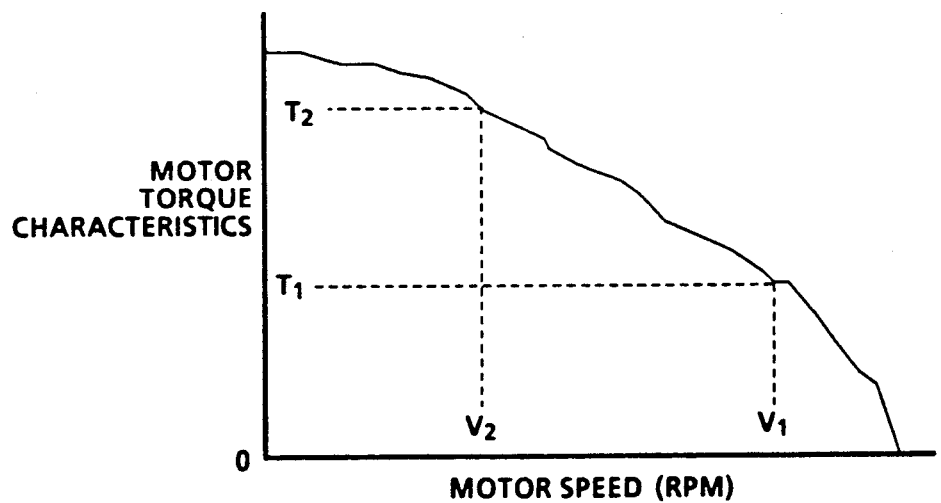
FIG. 3 shows a typical plot of motor torque characteristics versus motor speed over two time periods.
Figure 5:
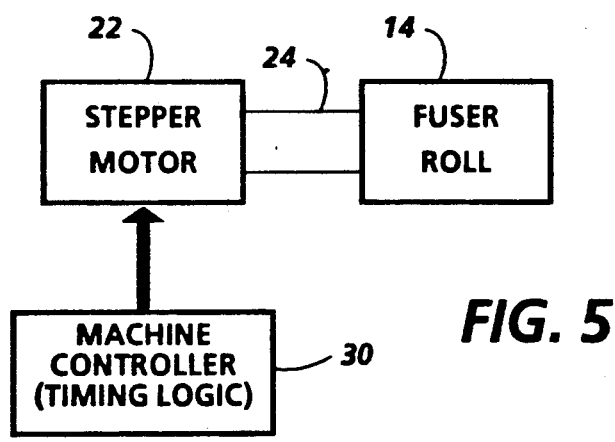
FIG. 5 is a schematic block diagram of a control circuit to regulate the speed of the stepper motor of FIG. 1.

Referring to FIG. 5, the fuser roll 14 is rotated during the fusing cycle by stepper motor 22 driving an input shaft 24. Stepper motor 22, prior to the present invention, would have been designed such that the maximum torque requirement at a single motor speed be at least as great as the highest load requirement for this fusing application. FIG. 2 shows the torque required to drive the load over the fusing cycle time period. At time $T_1$ the copy sheet 12 enters the nip 20 and the fusing cycle begins. The load torque requirement is fairly constant at a relatively low level, until the copy sheet leaves the nip at time $T_2$. The plot of torque over this time period is the load requirements Curve A. At the end of this fusing cycle time, $T_2$, the torque requirements increase. The stepper motor in the prior art system had to be selected such that it could drive the load (the fuser) at a constant speed $V_1$ through both the low and high torque segments. Thus, a prior art motor would be expected to have a maximum torque output greater than the highest load requirement, but during time $T_1$ to $T_2$, the motor is capable of delivering much more torque than is actually required. According to the present invention, it has been found that a more efficient stepper motor 22 can be utilized by varying the speed at which the stepper motor is driven in accordance with various phases of the duty cycle. Thus, instead of the stepper motor drive system being designed to maintain a constant speed $V_1$, the speed is changed at the critical time segments $T_1$, $T_2$ for this example. FIG. 3 shows a plot of motor torque characteristics versus motor speed. The motor runs at a velocity $V_1$ during a portion of the fusing cycle extending from time $T_1$ to time $T_2$ (FIG. 2). At the end of the fusing cycle (time $T_2$) if the input pulse rate to the motor is varied so as to reduce its speed to $V_2$ (for this example an approximately 44% reduction from speed $V_1$), the motor can supply the higher torque requirements without stalling. Thus, the stepper motor 22 of the present invention can be designed to require less power, take up less space, and be less expensive than the previous motors.

Figure 4:
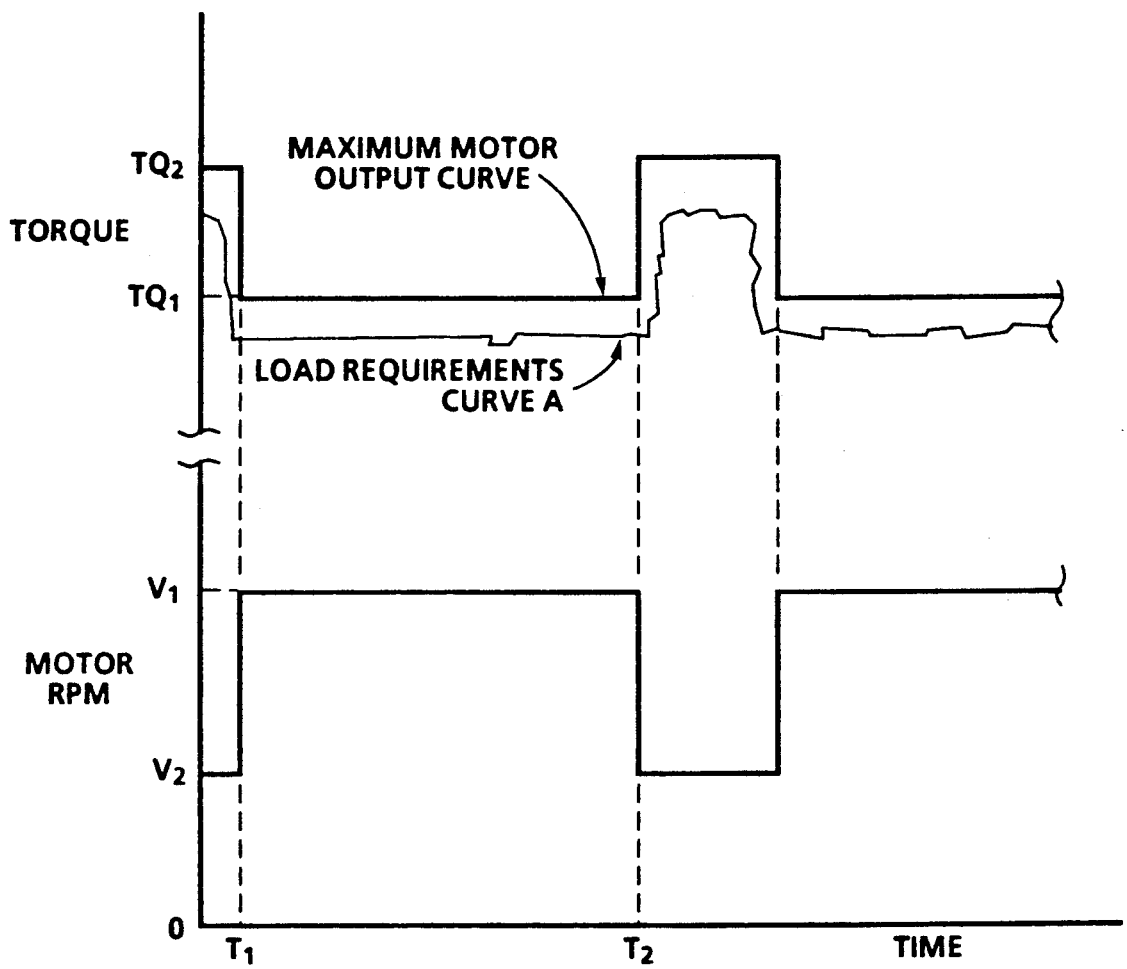
FIG. 4 shows FIG. 2 with an additional plot of maximum motor output torque superimposed.

FIG. 4 shows a relative relationship between FIG. 2 and the maximum output torque of the stepper motor if the motor speed is varied as shown in FIG. 4.

FIG. 5 shows a schematic block diagram of the stepper motor drive system. The machine controller 30 includes a variable generator and timer which supplies the signals which drive motor 22. At predetermined times during the copying cycle, the controller, 30, changes the pulse rate to the fuser drive motor 22 to match the load requirements.

While the invention has been described with reference to the structure disclosed it is not confined to the specific details set forth, but is intended to cover such modifications or changes as may come within the scope of the following claims:

I claim:

1. In a fuser station for a copier wherein copy sheets bearing a transferred image are introduced into a nip area formed between a fuser roll and a pressure web, drive means for driving said fuser roll through a duty cycle at two different torque requirements, the drive system including a stepper motor adapted to operate at a first constant speed consistent with a first low output torque requirement, and a second relatively lower constant speed consistent with the second torque requirement, and a controller adapted to change the speed of said stepper motor at times corresponding to the changing torque requirements.

* * * * *